(12) United States Patent
O'Hanlon et al.

(10) Patent No.: US 10,721,507 B2
(45) Date of Patent: Jul. 21, 2020

(54) SYSTEMS AND METHODS OF CONTENT TRANSACTION CONSENSUS

(71) Applicant: Linius (Aust) Pty Ltd.

(72) Inventors: Finbar O'Hanlon, Victoria (AU); Christopher W. Richardson, Zizkov (CZ); Gavin Campion, Victoria (AU)

(73) Assignee: Linius (Aust) Pty Ltd., South Yarra (AU)

( * ) Notice: Subject to any disclaimer, the term of this patent is extended or adjusted under 35 U.S.C. 154(b) by 119 days.

(21) Appl. No.: 16/001,592

(22) Filed: Jun. 6, 2018

(65) Prior Publication Data
US 2018/0352268 A1     Dec. 6, 2018

Related U.S. Application Data

(60) Provisional application No. 62/515,640, filed on Jun. 6, 2017.

(51) Int. Cl.
*H04L 29/06* (2006.01)
*H04N 21/239* (2011.01)
(Continued)

(52) U.S. Cl.
CPC ......... *H04N 21/2393* (2013.01); *G06F 21/10* (2013.01); *H04L 67/104* (2013.01);
(Continued)

(58) Field of Classification Search
CPC ............ G06F 21/10; G06F 2221/0746; G06F 2221/0775; G06F 2221/0788;
(Continued)

(56) References Cited

U.S. PATENT DOCUMENTS 9,860,589 B2 * 1/2018 Coburn, IV ....... H04N 21/4307
2016/0066010 A1 * 3/2016 Drope .............. H04N 21/25841
725/81
(Continued)

FOREIGN PATENT DOCUMENTS

WO     2017/038507      3/2017

OTHER PUBLICATIONS

International Search Report dated Aug. 24, 2018 in corresponding International application No. PCT/IB2018/054068 filed Jun. 6, 2018.
(Continued)

*Primary Examiner* — Joseph P Hirl
*Assistant Examiner* — Ka Shan Choy
(74) *Attorney, Agent, or Firm* — Womble Bond Dickinson (US) LLP (57) ABSTRACT

A method of content transaction consensus includes receiving a request to initiate a transaction for play of video or audio content, the request being received from a data network connected device having a native player. The transaction is validated by consensus in a peer-to-peer network that maintains a distributed ledger, and a record of the transaction is stored in the distributed ledger only when the transaction is validated. The record including a reference file for the video or audio content with a plurality of player control parameter values and linking data for one or more designated content sources outside the peer-to-peer network. And the method includes providing access to the reference file by the data network connected device to enable the data network connected device to play the video or audio content using the reference file and a content data file.

15 Claims, 9 Drawing Sheets

(51) Int. Cl.
*H04L 29/08* (2006.01)
*H04N 21/6587* (2011.01)
*H04N 21/233* (2011.01)
*H04N 21/231* (2011.01)
*H04N 21/439* (2011.01)
*H04N 21/44* (2011.01)
*H04N 21/2387* (2011.01)
*H04N 21/234* (2011.01)
*G06F 21/10* (2013.01)

(52) U.S. Cl.
CPC ......... *H04N 21/231* (2013.01); *H04N 21/233* (2013.01); *H04N 21/234* (2013.01); *H04N 21/2387* (2013.01); *H04N 21/439* (2013.01); *H04N 21/44* (2013.01); *H04N 21/6587* (2013.01); *G06F 2221/0746* (2013.01); *G06F 2221/0775* (2013.01); *G06F 2221/0788* (2013.01)

(58) Field of Classification Search
CPC .. H04L 67/104; H04N 21/231; H04N 21/233; H04N 21/234; H04N 21/2387; H04N 21/2393; H04N 31/439; H04N 21/44; H04N 21/6587
See application file for complete search history.

(56) References Cited

U.S. PATENT DOCUMENTS

| | | |
|---|---|---|
| 2016/0321435 A1 | 11/2016 | McCoy et al. |
| 2017/0078754 A1 | 3/2017 | O'Hanlon |
| 2017/0116693 A1 | 4/2017 | Rae et al. |
| 2018/0278582 A1* | 9/2018 | Cleaver .................. G06F 21/10 |

OTHER PUBLICATIONS

Xu Ruzhi et al., "Design of Network Media's Digital Rights Management Scheme Based on Blockchain Technology", 2017 IEEE 13th International Symposium on Autonomous Decentralized System (ISADS), IEEE, Mar. 22, 2017, pp. 128-133, retrieved on Jun. 6, 2017.

* cited by examiner

Blockchain applied to Content

Blockchain utilizing content = Public Consensus Security
Trust Computing
Smart Contracts on fixed video assets
Proof of Work Utilization

The Content Blockchain

FIG. 1

Ledger differences: Blockchain vs Content Blockchain

The Content Blockchain Ledger is an enhanced ledger specially designed for the control and playback of digital content.

This special ledger contains transaction and access control information as well as linkage data to video frame data.

The linkage data, is only delivered once all parties in consensus agree. This allows for 3rd parties to sit between the content fulfillment and allows for Big data fueled artificial intelligence to be the programmatic engine for frame accurate individually personalized video productions, and much much more.

SYSTEMS AND METHODS OF CONTENT TRANSACTION CONSENSUS

CROSS-REFERENCE TO RELATED APPLICATION(S)

The present application claims priority to U.S. Provisional Patent Application No. 62/515,640, entitled: Video Content Blockchain, filed on Jun. 6, 2017. The present application is related to U.S. Pat. Nos. 9,955,222 and 9,918,134, issued on respectively Apr. 24 and Mar. 13, 2018, both entitled: Method and System for Content Delivery. The present application is also related to U.S. Pat. Nos. 9,544,657; 9,516,392 and 8,893,203, issued on respectively Jan. 10, 2017, Dec. 6, 2016 and Nov. 18, 2014, all of which entitled: Method and System for Content Delivery. The present application is further related to PCT Application No. PCT/AU2008/001190, filed on 15 Aug. 2008, which claims priority from U.S. Provisional Patent Application No. 60/956,405 filed on Aug. 17, 2007, the above-referenced PCT International Application being published in the English language as International Publication No. WO 2009/023902 Feb. 26, 2009. The contents of all of the aforementioned are incorporated herein by reference in their entireties.

TECHNOLOGICAL FIELD

The present disclosure relates generally to digital video content delivery and, in particular, digital video content delivery utilizing video content blockchain architecture.

BACKGROUND

It is known to provide content accessible over a network such as the Internet. A common way to access content over the Internet on a device such as a personal computer is by using a web browser and a search engine to locate desired content. Where the content is video content, such as movies or video clips, the content can be viewed using a video player application, also known as a plug-in, provided in the web browser. The play of the video content is controlled through the web site using the plug-in player. Problems with the quality of the viewing experience can include poor resolution of images or pixilation of images, jitter or harshness of the moving image, such problems are often due to bandwidth limitations or processing capacity.

A known system attempts to overcome the above problems by compiling and formatting video data in a specific format for providing to users over the Internet which can be played by a special player designed to play the specific format video data files. This system has drawbacks from the user side, due to having to purchase the special player, and from the video content provider side, as it is necessary to re-format any video content for use with the player.

There is a need for a system which provides an improved Internet video content access and viewing experience.

BRIEF SUMMARY

The above cited and incorporated patent applications and patents describe systems and methods for digital video content delivery in which a reference file including a plurality of player control parameter values and linking data for one or more content sources is provided. This linking data is used to acquire content from the content sources for display on the user device. Example implementations of the present disclosure extend those and other systems and methods to incorporate blockchain.

A blockchain is a distributed database that maintains a list of ordered, time-stamped records called blocks, and it has traditionally been used as a ledger of transactions. Example implementations of the present application extend blockchain by the separation of digital video content into virtual blocks and video DNA (vDNA) blocks, and the storage of these blocks as a chain such that each block needs consensus prior to being delivered in a complete manner. The separation of digital video content into these blocks allows for different third-party party technologies like artificial intelligence (AI), and reporting to intersect each transaction.

Example implementations of the present disclosure have the potential to deliver a much more advanced block chain solution than a simple transaction ledger, where a transaction is the distribution of an entire digital video file. Digital video files and digital content files including audio and video content are just data structures. When these data structures are disassembled at index and assembled at play, the digital content files become integral to a new more secure, more controlled and more flexible blockchain.

Splitting digital video content at discovery and delivering each block in two separate processes allows for greater control and flexibility across the blockchain. Transactions can be at a binary data level of the content itself. So the content carries its own micro ledger. In this manner, example implementations of the present disclosure can provide visibility, accountability, audit and management at a data level, and provide all of our new use case possibilities such as piracy and personalized ads (these tools can form part of the consensus of the chain in that they need be satisfied for the video to play). And these benefits can be provided while providing endless flexibility and monetization of consumption of video without disrupting workflows, and as part of the blockchain.

The present disclosure thus includes, without limitation, the following example implementations.

Some example implementations provide a method of content transaction consensus, the method comprising receiving a request to initiate a transaction for play of video or audio content, the request being received from a data network connected device having a native player; validating the transaction by consensus in a peer-to-peer network that maintains a distributed ledger; storing a record of the transaction in the distributed ledger only when the transaction is validated, the record including a reference file for the video or audio content with a plurality of player control parameter values and linking data for one or more designated content sources outside the peer-to-peer network; and providing access to the reference file by the data network connected device to enable the data network connected device to play the video or audio content, the data network connected device: providing player control commands to the native player based on the player control parameter values, including player control commands directing the native player to acquire content data compatible with the native player from within a content data file of one or more of the designated content data sources via the data network using the linking data; acquiring content data by the native player from the one or more content sources; and playing, by the native player, the content acquired from each content source in accordance with the player control commands.

In some example implementations of the method of any preceding example implementation, or any combination of any preceding example implementations, the distributed ledger is a blockchain, and storing the record of the transaction includes recording the transaction in a block of the blockchain.

In some example implementations of the method of any preceding example implementation, or any combination of any preceding example implementations, providing access to the reference file includes providing access to the distributed ledger and thereby the record of the transaction and the reference file included therein.

In some example implementations of the method of any preceding example implementation, or any combination of any preceding example implementations, the method further comprises generating the reference file in response to the request.

In some example implementations of the method of any preceding example implementation, or any combination of any preceding example implementations, the method further comprises generating the reference file before the request is received.

Some example implementations provide an apparatus for content transaction consensus. The apparatus comprises a memory configured to store computer-readable program code; and a processor configured to access the memory, and execute the computer-readable program code to cause the apparatus to at least perform the method of any preceding example implementation, or any combination of any preceding example implementations.

Some example implementations provide a computer-readable storage medium for content transaction consensus. The computer-readable storage medium is non-transitory and having computer-readable program code stored therein that in response to execution by a processor, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. As used herein, for example, the singular forms "a," "an," "the" and the like include plural referents unless the context clearly dictates otherwise. The terms "data," "information," "content" and similar terms may be used interchangeably, according to some example implementations of the present invention, to refer to data capable of being transmitted, received, operated on, and/or stored. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

As described herein and in the accompanying figures, the following acronyms may be used:
AI—Artificial Intelligence
AWS—Amazon Web Services
CDN—Content Delivery Network
IP—Intellectual Property
MP4—MPEG-4 (one, non-limiting example of a suitable type of file with which implementations of the present disclosure may work)
MPEG—Moving Pictures Expert Group
vDNA—video DNA (data without a container, may be video or any other suitable media file of a structured format)
VVE—Video Virtualization Engine Example implementations of the present disclosure are directed to a content blockchain that applies a blockchain methodology to digital content files. As described above and shown in FIGS. 1 and 2, a blockchain is a distributed database that maintains a list of ordered, time-stamped records called blocks, and it has traditionally been used as a ledger of transactions. The content blockchain of example implementations extend blockchain by the separation of digital video content into virtual blocks and video DNA (vDNA) blocks, and the storage of these blocks as a chain such that each block needs consensus prior to being delivered in a complete manner. The separation of digital video content into these blocks allows for different third-party party technologies like artificial intelligence (AI), and reporting to intersect each transaction.

Example implementations of the present disclosure provide a new generation of opportunities for content owners and broadcasters who wish to improve content workflows, enhance security, establish trust, provide transparency and provide programmatic one-to-one personalization of content digital content, which may be powered by AI or big data. And this may at the same time provide new monetization opportunities for content by driving consumer engagement via programmatic content delivery.

The content blockchain extends a blockchain by utilizing digital content files at their data level where the traditional ledger record becomes or includes a virtual file (at times referred to as a reference file). The vDNA (the data, without the container) (at times referred to as a content data file) sits in a controlled "private" network such as the content owner's physical network, or one to which they outsource their private content (e.g., the cloud or a CDN). A node with the virtual file (an integrated ledger) must attain consensus to receive the vDNA, and this consensus requires meeting certain business rules (e.g., a smart contract agreement). Consensus is not achieved in instances in which the business rules are not met. Only after consensus is achieved, is the vDNA delivered to the node, reassembled into media, and played.

The content blockchain not only provides access control, it provides the power of smart contracts to monetize segments of footage without editing content, the power to interface data intelligence and big data in automatically programming individually personalized content production to an end user, in seconds, because the removal of the need for content rendering. The content blockchain is like a place where any data may be stored semi-publicly in a container space (the virtual block). Anyone can verify that a source placed that information because the container has the source's signature on it, but only the source (or a program) can unlock the connection to the vDNA stored inside the container because only the source holds the private keys to that data, securely. So the content blockchain behaves almost like a database, except that part of the information that is public is the signature, access controls and empty file structure.

Smart contracts are the building blocks for decentralized applications. A smart contract is a set of rules around a set of values such as financial values, territorial or geographic values for licensing controls, even controls driven by AI or big data systems. Smart contracts are the contractual governance between two or more parties, contracts that can be verified programmatically via the blockchain, instead of via a central arbitrator. They sit in the flow of vDNA so any third-party application or service can sit between the finalization of content delivery. Because of this, computer systems can use smart contracts to programmatically build individually personalized content files and manage the transactional value. Or a transaction system can interface with the content blockchain, computer system and content provider to authorize a newly-produced piece of content where vDNA sits across different network nodes with different values and different licensing structures and have it delivered into a unique stream within seconds of a user hitting play.

Figure 1:
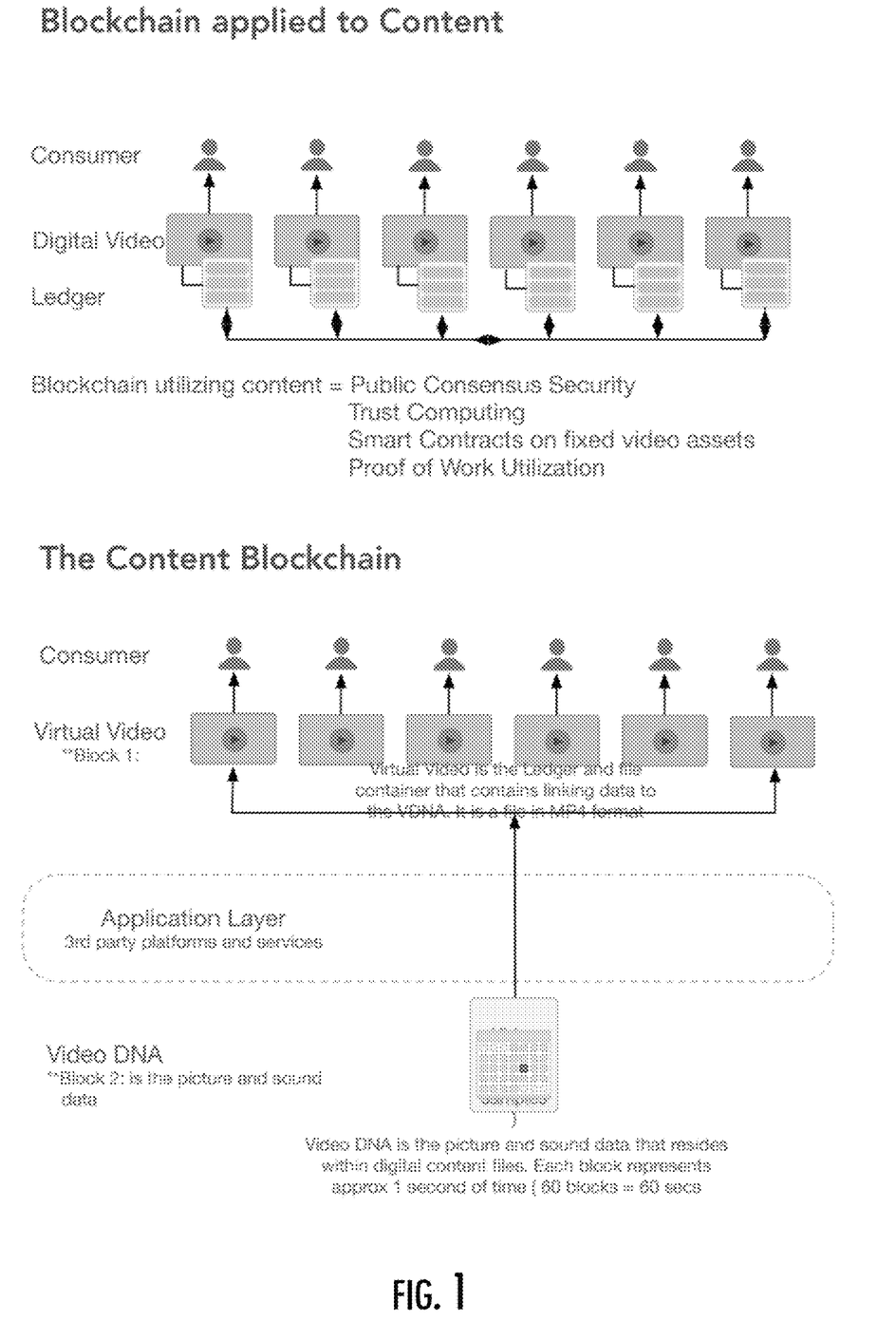
FIG. 1 illustrates a traditional transactional blockchain versus the content blockchain of example implementations of the present disclosure.

As more particularly shown in FIG. 1, in a typical blockchain applied to content, the actual blockchain ledger only contains the transactional information, and the content is linked to that transactional information. This current linkage is shown in the top part of FIG. 1, "Blockchain applied to Content." But once the content is delivered, the linkage is broken. That content is a "master" file that can be easily shared, duplicated, or transacted upon without updating the ledger. The bottom part of FIG. 1, the "The Content Blockchain," shows how digital video content is integrated inside of each block of the blockchain.

Virtual video is a form of ledger that describes to a video player where the video data resides and how it is to be presented. In the content blockchain, this virtual video becomes part of the blockchain ledger, so both the transaction information and a portion of the final video are incorporated in the block. This consolidation of a portion of the video itself and the transaction information inside a blockchain block enforces trust and transactional validity inherently to the same strength as the blockchain itself. For a media file that is structured, binary data can be separated into the "structure" and the "data." By leaving the data remote, but incorporating the structure element of the content into the blockchain, the blockchain capabilities are extended to the media/content.

Figure 2:
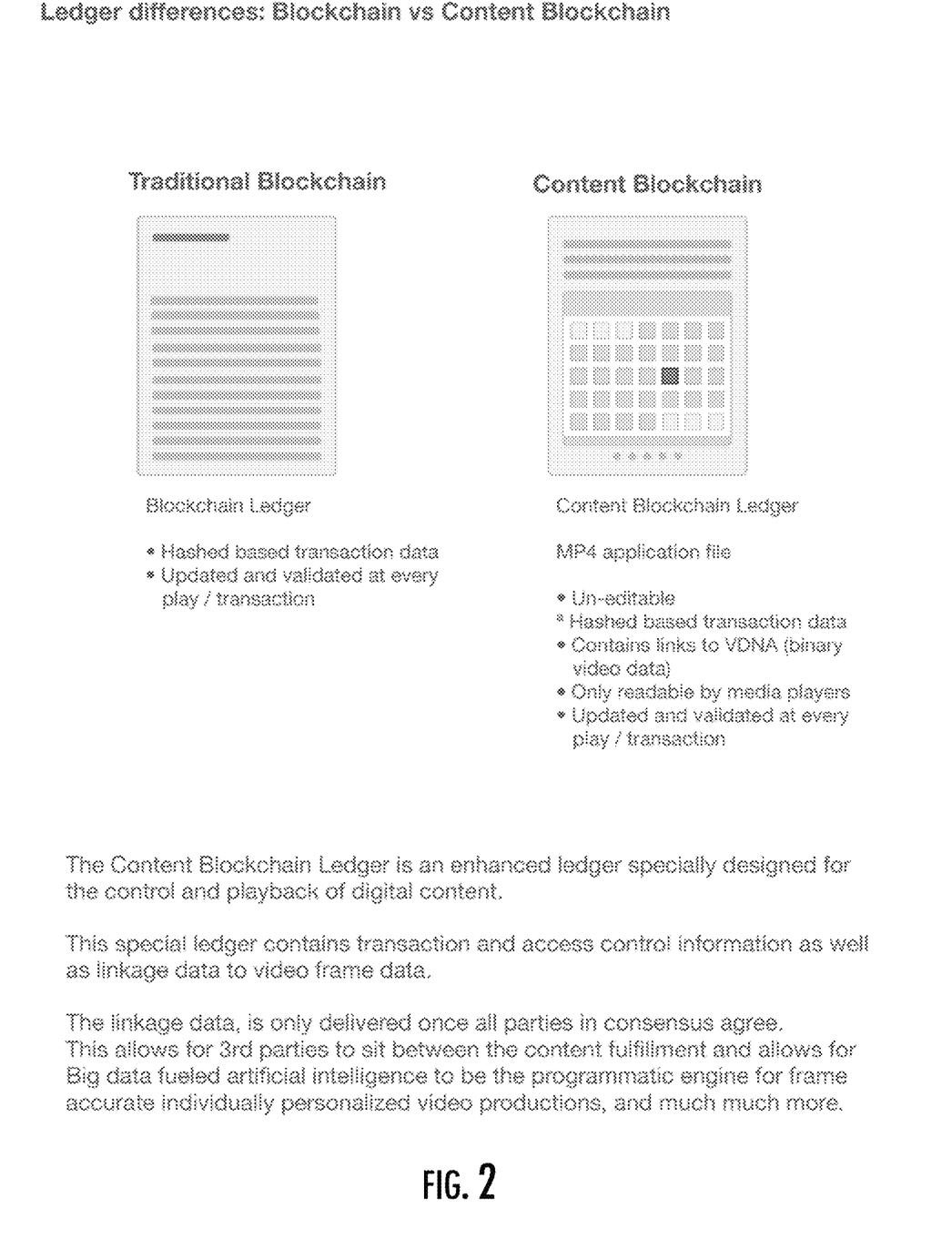
FIG. 2 illustrates ledger differences between the traditional transactional blockchain and the content blockchain of example implementations.

FIG. 2 illustrates ledger differences between the traditional transactional blockchain and the content blockchain of example implementations. In a cryptocurrency blockchain implementation, there are a number of different fields that can define how a block is structured, such as the magic number, followed by the block size, and the block header that itself includes a number of different items (e.g., version, hash previous block, hash merkle root). Just as most blockchain definitions have block headers, most media formats have headers (e.g., for digital video, ISO 14496 part 4 (aka, MPEG-4)), which include different items, including a hash (or sample table) that describes where and how the media data exists and is to be played.

The content blockchain has a block structure that may be a hybrid or amalgamation of a traditional blockchain header and a media file header, with FIG. 2 describing an example of an ISO-based MPEG-4 header. This amalgamation brings the structural header information of the media file into the blockchain block. Just as with a traditional blockchain, once the content blockchain achieves consensus on a transaction, the block is verified, and the same properties that would apply to a cryptocurrency apply to the media header.

Figure 3:
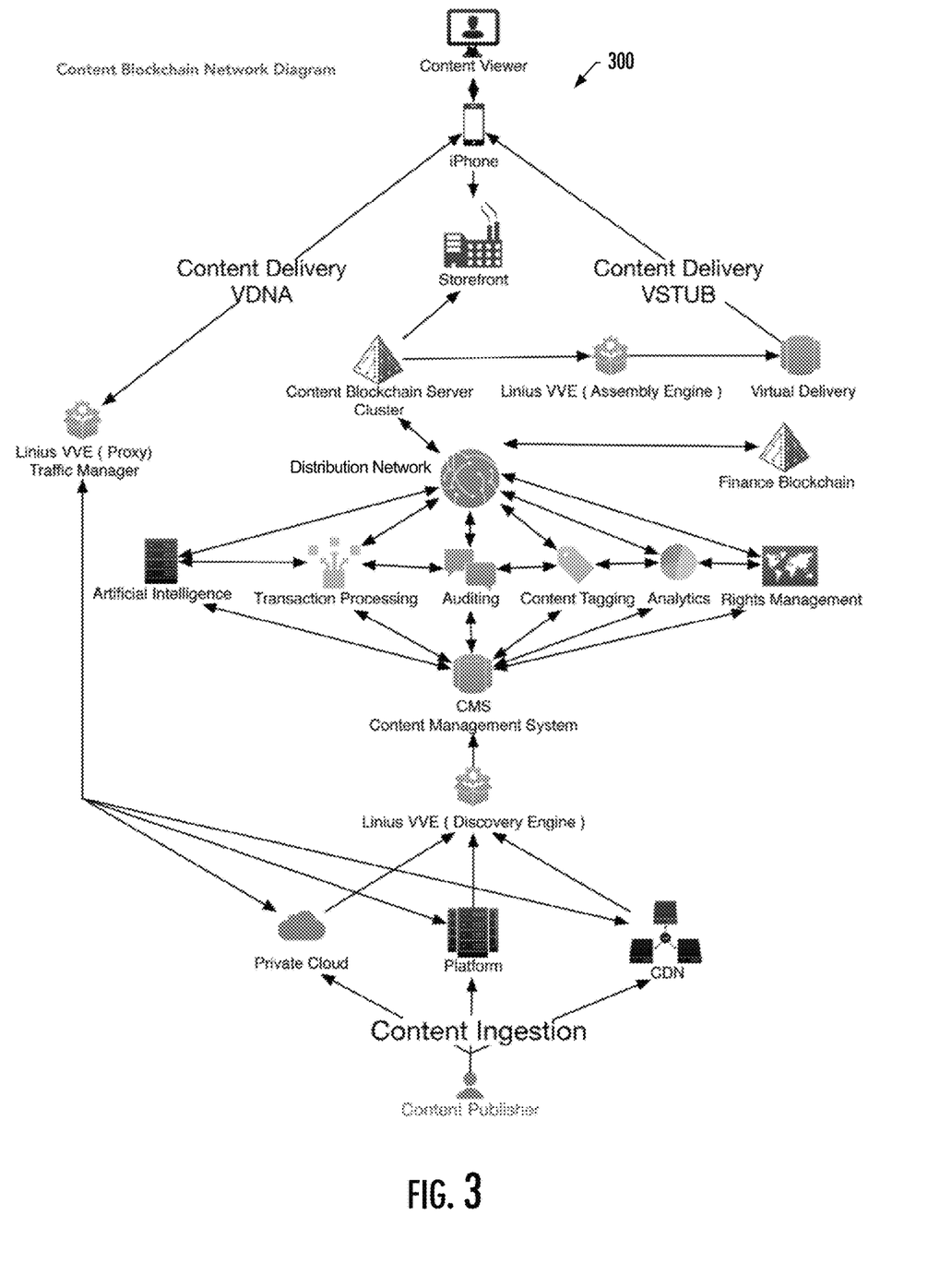
FIG. 3 is a process-flow diagram of a content-distribution ecosystem from content publisher to content viewer, including the content blockchain, according to example implementations.
Figure 4:
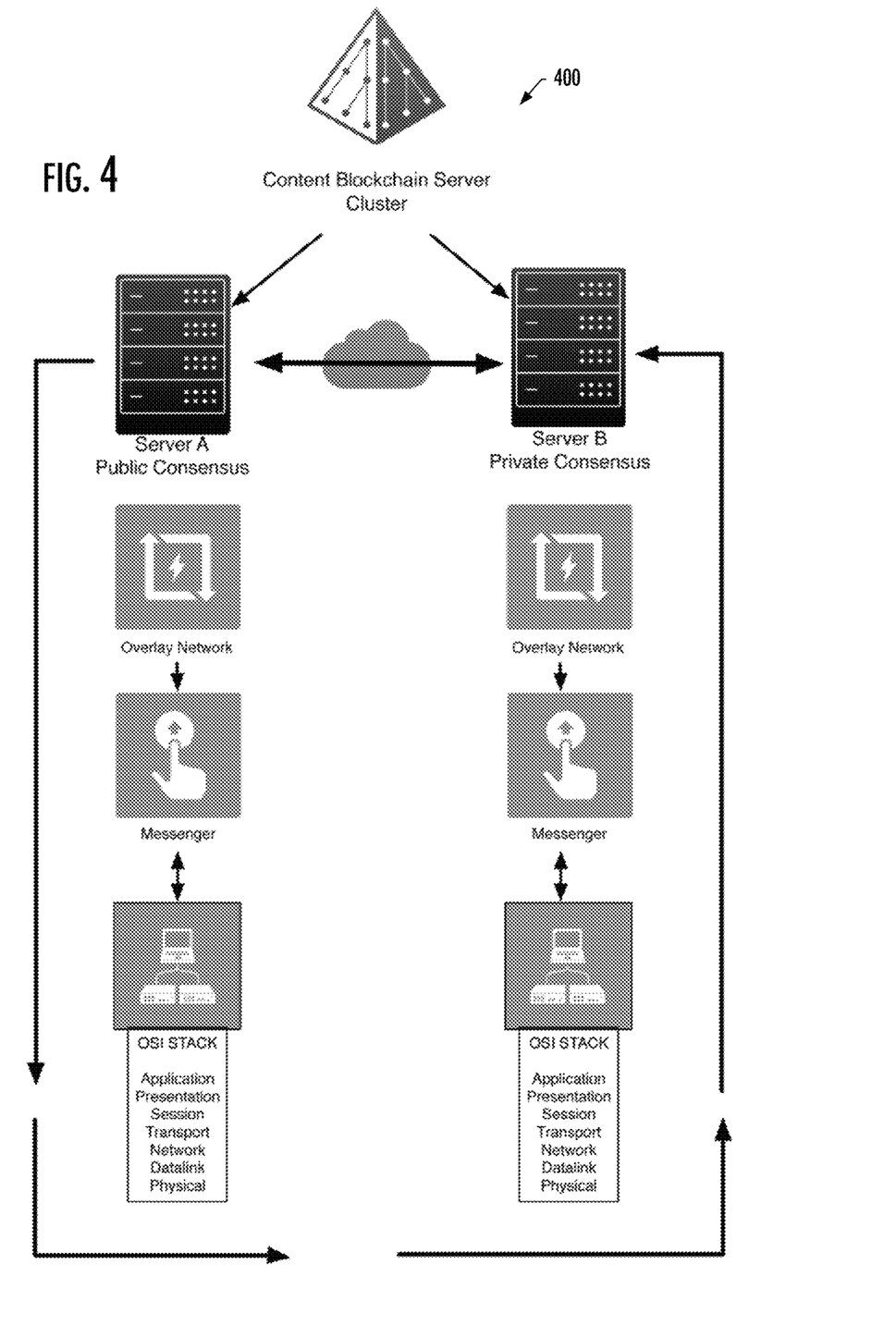
FIG. 4 illustrates more particularly a content blockchain server cluster, according to example implementations.

FIG. 3 is a process-flow diagram of a content-distribution ecosystem 300 from content publisher to content viewer, including the content blockchain, according to example implementations of the present disclosure. FIG. 4 illustrates more particularly a content blockchain server cluster 400, according to example implementations of the present disclosure. As shown, the system may be implemented with an Internet-based computing architecture including a computer network or a number of interconnected computer networks in or over which a number of subsystems (each an individual system), computers and the like communicate or otherwise operate. The network may be implemented as one or more wired networks, wireless networks or some combination of wired and wireless networks. The network may include private, public, academic, business or government networks, or any of a number of different combinations thereof, and in the context of an Internet-based computing architecture, includes the Internet. The network may support one or more of any of a number of different communications protocols, technologies or the like, such as cellular telephone, Wi-Fi, satellite, cable, digital subscriber line (DSL), fiber optics and the like.

In the system 300, the subsystems and computers connected to the network may also be implemented in a number of different manners. One example of a suitable computer is a server computer although other implementations are contemplated (e.g., mainframe computer, personal computer). Another example of a suitable computer is a mobile device such as a smartphone. Other examples of suitable mobile devices include portable computers (e.g., laptop computers, tablet computers), cellular phones, wearable computers (e.g., smartwatches, optical head-mounted displays) and the like.

A server computer may be embodied as one or more server computers, a network of interworking computing devices (e.g., a distributed computer implemented by multiple computers) or the like. In some examples, the servers may be embodied as or otherwise form part of network of interworking computing devices, such as in a peer-to-peer computing architecture. This may enable a number of configurations of the system or in which the system participates. One example of a suitable configuration is a distributed database such as a blockchain. As shown, in some examples, the system includes a content blockchain used to distribute video content as introduced above and described below, and the system may include a finance blockchain used as a ledger of financial transactions.

In FIG. 3, a content publisher typically publishes their content into a private cloud, a platform (such as a content management system), a content delivery network (CDN), or some combination thereof. In one example implementation, the content may then be "discovered"—a process of virtualization that indexes the media headers—and publishes a virtual version of the content into a content management system (CMS). Also shown is a distribution network such as the Internet. During this phase of content-distribution, numerous tools may be applied to the content, such as artificial intelligence, transaction processing, auditing, tagging, analytics, and rights management. To this point in the diagram, the general process of content distribution to a network for consumption has been described.

As shown at the top of the diagram in FIG. 3, when a content viewer desires to access some content, the content viewer uses a device or software on a device (such as the iPhone in the figure), to access a location on the network where the content can be acquired (e.g., a storefront). In a typical deployment today, the storefront or other content source would connect directly to the distribution network. In the content blockchain distribution model, a content blockchain server is inserted in this part of the process. In the diagram, this is the content blockchain server cluster, but could be a single server, a cluster of servers, or a collection of software running on real or virtual servers.

When a storefront wishes to make a new piece of content available, it finds the content on the network, and instructs the content blockchain server (or server cluster) to create a new block based on the headers as described in FIG. 2. This is a high-level diagram, and at a greater level of granularity, the content blockchain server may be shown to perform a number of functions, such as consensus building to verify transactions. To the right of the distribution network is a "finance blockchain," which is optional and represents a traditional blockchain that could be extended to create a content blockchain. Another function of the content blockchain server is to issue instructions for the creation of consumable media headers (e.g., virtual videos) for the end user. The virtual delivery component delivers the remaining components (the content hash/sample data) to the content viewer's viewing device, potentially including the transactional history data from the content blockchain block for these particular origin media (a virtual file). The viewer can then retrieve the media's data from the point of publishing, optionally being proxied by a traffic manager.

Relative to FIG. 4, a content blockchain server cluster can operate multiple consensus models for validating transactions. Examples of suitable consensus models include proof-of-work, proof-of-stake, and agreed consensus. The server may support arbitrary (and arbitrarily many) models both because models may change over time, and because there may be different parties with different interests (e.g., content owners may wish to use a private consensus governed by digital contracts; while the end-viewers may want the privacy and distributed trust of a proof-of-work consensus). FIG. 4 also shows that the underlying technology of the content blockchain can contain any kind of computational process across the entire OSI (Open Systems Interconnection model) stack.

As introduced above and described below, the technology concept behind the content blockchain is similar to that of a database, except that the way one interacts with the database is different. The content blockchain extends the blockchain in providing decentralized consensus, trusted computing, smart contracts, and proof of work/stake.

Figure 5:
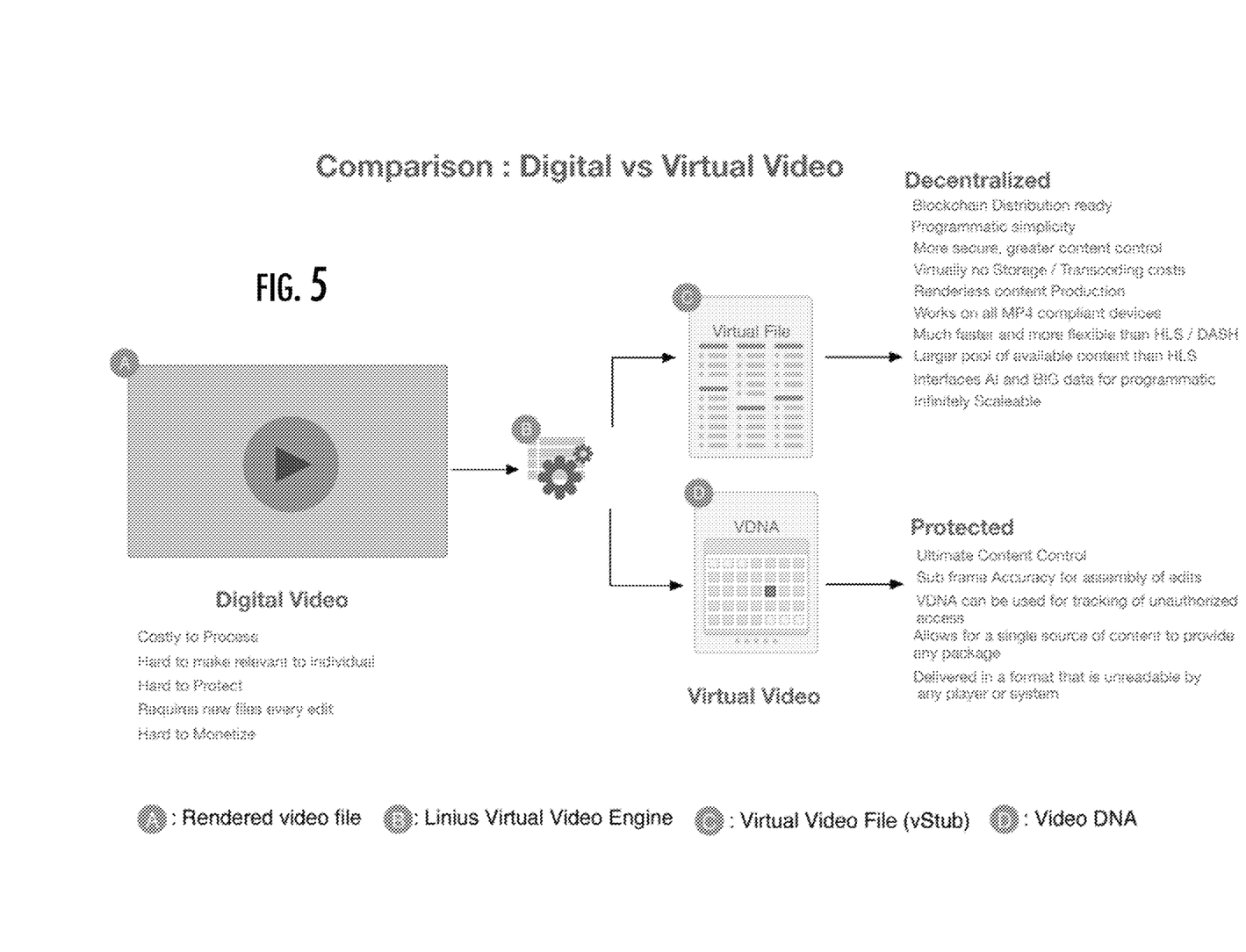
FIG. 5 illustrates a comparison of digital media versus virtualized media according example implementations.

In accordance with example implementations of the present disclosure, digital content is split into two components that are maintained in different network nodes. The first component, "the ledger," is a virtual file that contains the core digital content container which houses extracted audio and video samples. This component is distributed across the decentralized network, the virtual block. The second component is the vDNA (extracted video and audio samples), and it is maintained in a protected set of protected, accessible network (e.g., cloud) environments, the content block. Each sample in the vDNA is binary block data representing a group of video frames of pictures. FIG. 5 illustrates a comparison of digital media versus virtualized media as described in FIG. 1, according to some examples of virtual video.

As shown in FIG. 5, digital video (a) may be rendered into a solid block. The process of virtualization (b) may reverse-engineer that block into its initial components of a virtual video file (c) and raw or encoded data (d). The virtual video file, much like a database, may be an architectural structure that tells the receiving component how to display the media. The actual structure varies by media type, but may be exemplified by MPEG-4 in the world of video. This uncoupling of the data from the header of the media file allows the structural components to be included in a blockchain block.

The digital content is unique and may be delivered across various nodes upon each transaction. As soon as the content is delivered to a user or aggregator or distributor it is decentralized. Because of this, rules may be in place to centralize decentralized content files, and these rules may add complexity to handle, process, authenticate and track the content. Virtual content on the content blockchain provides the power of decentralization, with the power of control, due to multiple layers of access control. The consensus network validates the virtual content, and the access control methods allow the flow of vDNA. This vDNA flow assembles on a user's device in response to the user pressing play, in some examples within seconds. And splitting content IP from its virtual container and assembling the two back together at play using the content blockchain, means that the content blockchain can verify every transaction, every asset, on every device forever.

Figure 6:
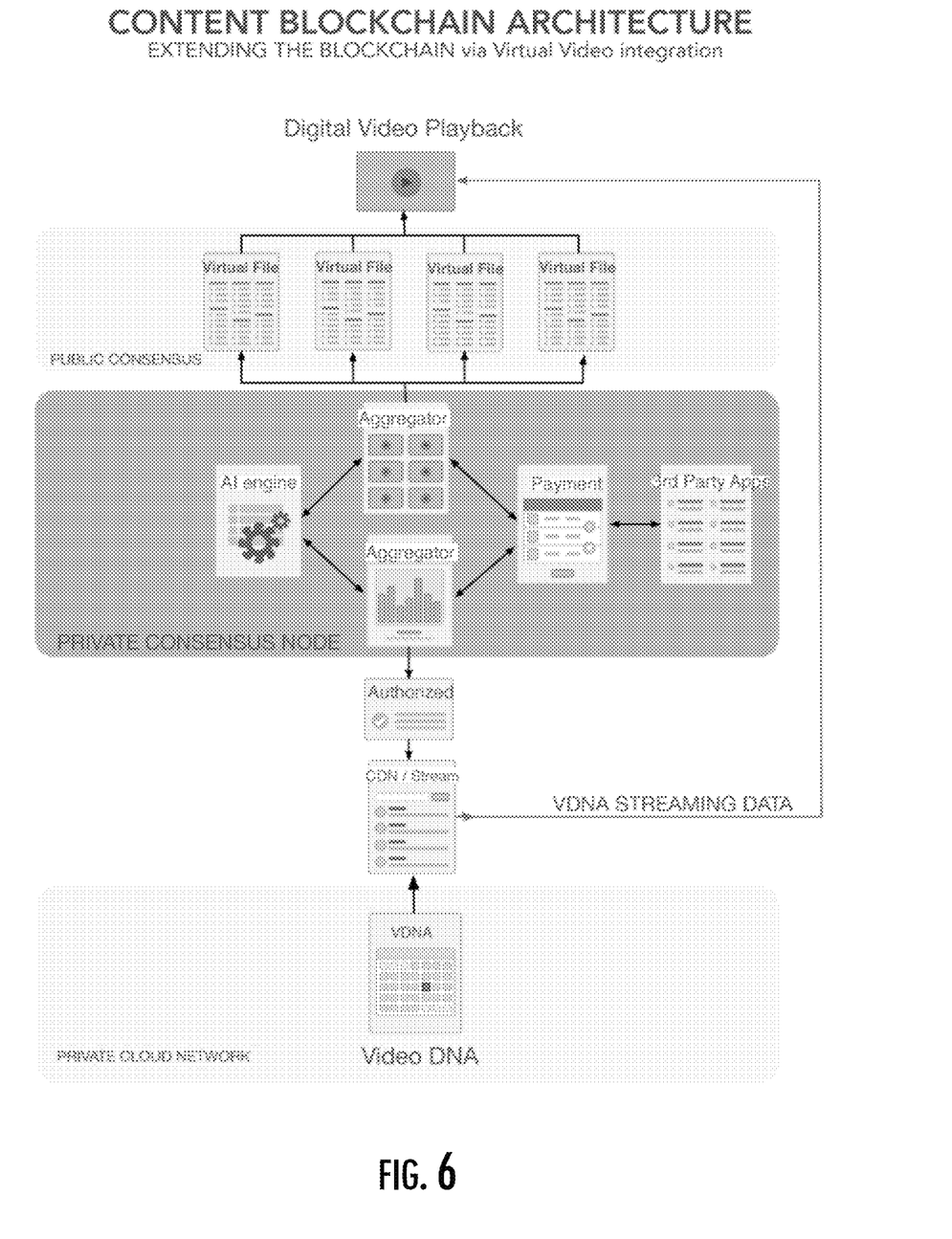
FIG. 6 is a flow diagram for a transaction according to example implementations.
Figure 7:
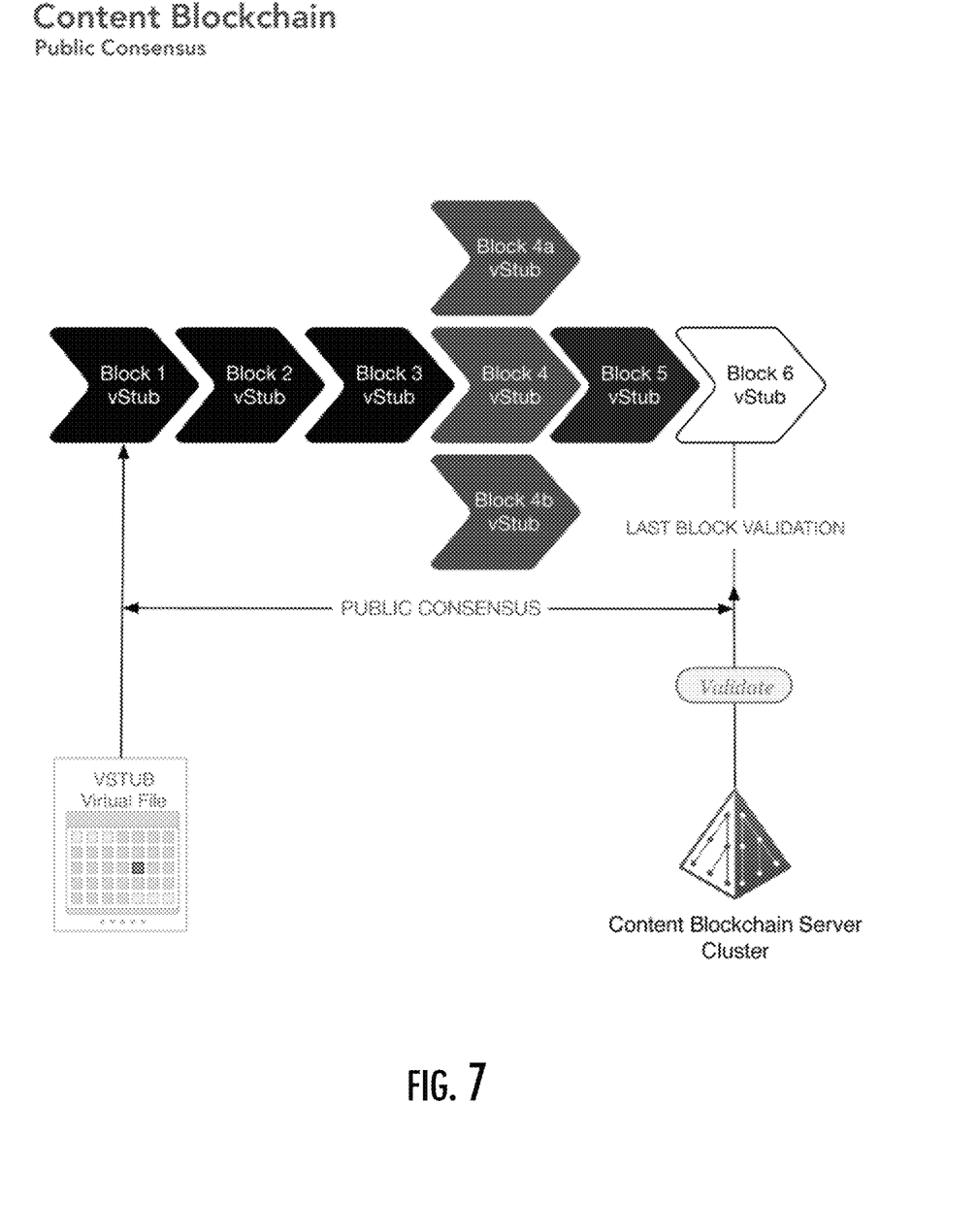
FIG. 7 illustrates public consensus according to some example implementations.

FIG. 6 is a flow diagram for a transaction according to example implementations. And FIG. 7 illustrates public consensus according to some examples.

FIG. 5 showed how a rendered video can be decomposed into two data structures: a virtual file and video data (video DNA). FIG. 6 in particular illustrates how these two components may sit within a content blockchain architecture. A public consensus model such as that according to FIG. 7 may be applied to any transaction involving virtual video files, which are incorporated in the content blockchain. This public content blockchain may be populated either directly by content creators (e.g., individual contributors), or by a private blockchain, which separately achieves consensus between related content rights holders, and potentially grants those rights to the public blockchain through digital contracts. Regardless of the number of levels of hierarchy in the content blockchain (a two level hierarchy is shown in the diagram, but there could be one or more), the media data may only be distributed and may only be played after consensus of the rights of the virtual file is achieved and granted.

In accordance with example implementations, all components of the blockchain must be in agreement for a transaction to be fulfilled. In some examples, these include a virtual file distributed in an open network (Internet), an access request (user), the virtual file delivered with authentication, (e.g., user ID, machine ID), consensus check on validity of the virtual asset and authentication across the consensus network, (auth: location, timestamp etc.), vDNA data delivery from controlled network to open network (vDNA=uncompilable binary data), and assembly at user device to form fully formed video file. In some examples, using the content blockchain, smart contracts can be inserted at point of production (programmatic via AI or big data) or at point of transaction (reporting and transaction engines).

Figure 8:
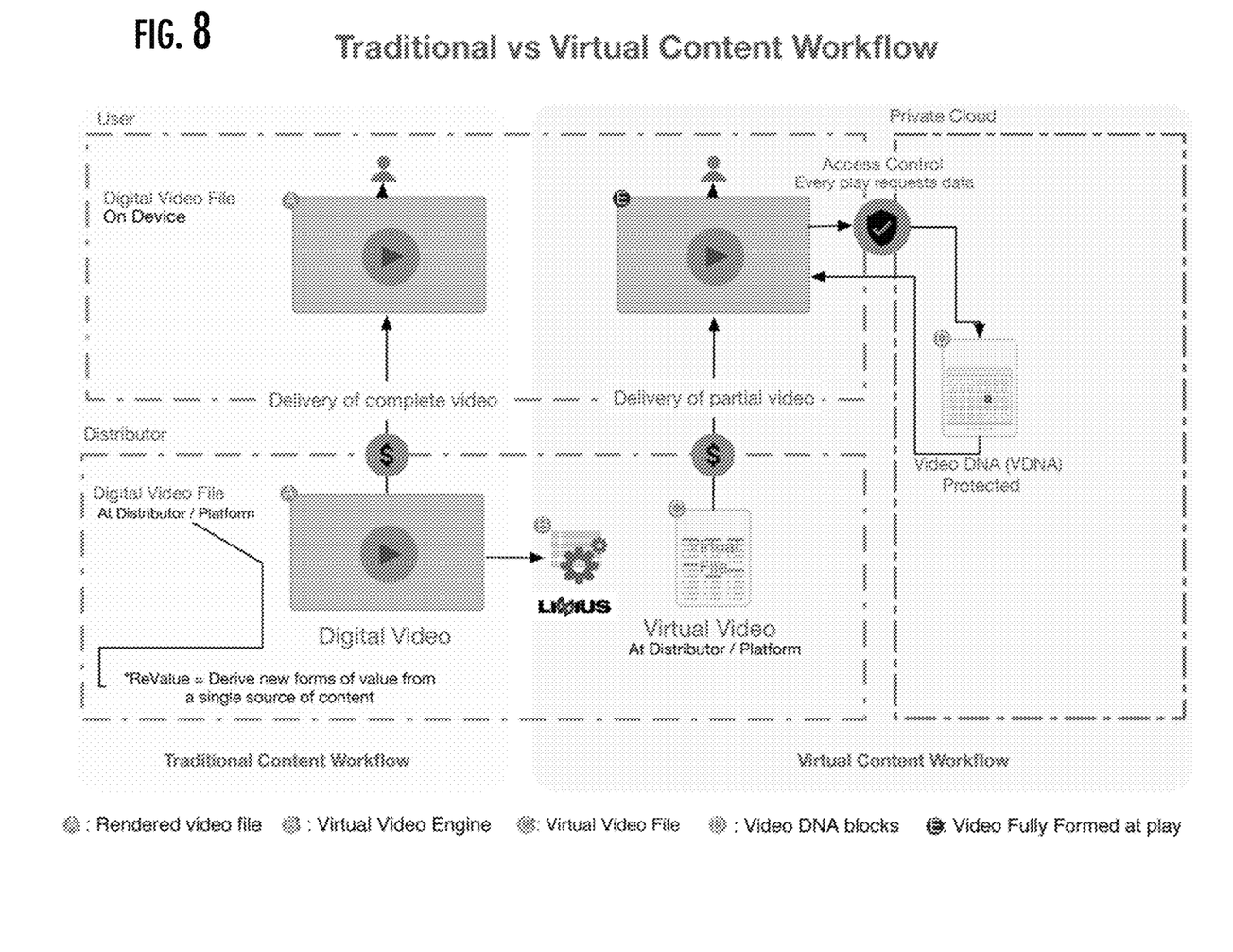
FIG. 8 illustrates a traditional content workflow versus a virtual content workflow according to some example implementations.

To further illustrate example implementations of the present disclosure, FIG. 8 illustrates a traditional content workflow versus a virtual content workflow.

As described above and illustrated in the accompanying figures, the content blockchain provides the openness of a traditional blockchain via virtual files and the control of content via controlled vDNA delivery. In the content blockchain, content can be programmatically produced for an individual without re-rendering. The content blockchain may also have inherited benefits of content control never seen before in the media industry. In this regard, the technology requires no transcoding for video, or storage for the files created from the video edits. It enhances existing systems as opposed to replacing them, enhances every part of the digital content value chain, drives the value of all the technologies in place surrounding content, interfaces big data and artificial intelligence, and/or "provides off the scale" levels of speed in the production and identification of content.

According to example implementations of the present disclosure, the system 300 and its subsystems and computers may be implemented by various means. Means for implementing the system and its subsystems and computers may include hardware, alone or under direction of one or more computer programs from a computer-readable storage medium. In some examples, one or more apparatuses may be configured to function as or otherwise implement the system and its subsystems and computers shown and described herein. In examples involving more than one apparatus, the respective apparatuses may be connected to or otherwise in communication with one another in a number of different manners, such as directly or indirectly via a wired or wireless network or the like.

Figure 9:
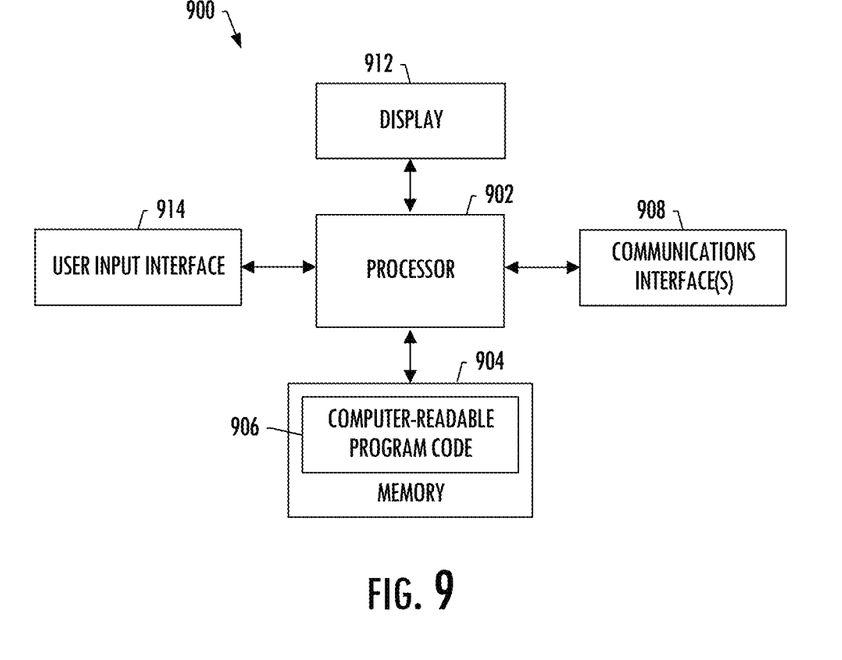
FIG. 9 illustrates an apparatus according to example implementations.

FIG. 9 illustrates an apparatus 900 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, a processor 902 connected to a memory 904 (e.g., storage device).

The processor 902 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 904 (of the same or another apparatus).

The processor 902 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 904 is generally any piece of computer hardware that is capable of storing information such as, for example, data, computer programs (e.g., computer-readable program code 906) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 904, the processor 902 may also be connected to one or more interfaces for displaying, transmitting and/or receiving information. The interfaces may include one or more communications interfaces and/or one or more user interfaces. The communications interface(s) may be configured to transmit and/or receive information, such as to and/or from other apparatus(es), network(s) or the like. The communications interface may be configured to transmit and/or receive information by physical (wired) and/or wireless communications links. The communications interface(s) may include interface(s) 908 to connect to a network, such as using technologies such as cellular telephone, Wi-Fi, satellite, cable, digital subscriber line (DSL), fiber optics and the like.

The user interfaces may include a display 912 and/or one or more user input interfaces 914. The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen) or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by processor, or storage of instructions in a computer-readable storage medium, supports combinations of operations for performing the specified functions. In this manner, an apparatus 900 may include processor 902 and a computer-readable storage medium or memory 904 coupled to the processor, where the processor is configured to execute computer-readable program code 906 stored in the memory. It will also be understood that one or more functions, and combinations of functions, may be implemented by special purpose hardware-based computer systems and/or processor which perform the specified functions, or combinations of special purpose hardware and program code instructions.

As explained above, the present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for content transaction consensus, the apparatus comprising:
  a memory configured to store computer-readable program code; and
  a processor configured to access the memory, and execute the computer-readable program code to cause the apparatus to at least:
  receive a request to initiate a transaction for play of video or audio content, the request being received from a data network connected device having a native player;
  validate the transaction by consensus in a peer-to-peer network that maintains a distributed ledger;
  store a record of the transaction in the distributed ledger only when the transaction is validated, the record including a reference file for the video or audio content with a plurality of player control parameter values and linking data for one or more designated content sources outside the peer-to-peer network; and
  provide access to the reference file by the data network connected device to enable the data network connected device to play the video or audio content, the data network connected device being enabled to at least:
    provide player control commands to the native player based on the player control parameter values, including player control commands directing the native player to acquire content data compatible with the native player from within a content data file of one or more of the designated content data sources via the data network using the linking data;

acquire content data by the native player from the one or more content sources; and play, by the native player, the content acquired from each content source in accordance with the player control commands.

2. The apparatus of claim 1, wherein the distributed ledger is a blockchain, and the apparatus being caused to store the record of the transaction includes being caused to record the transaction in a block of the blockchain.

3. The apparatus of claim 1, wherein the apparatus being caused to provide access to the reference file includes being caused to provide access to the distributed ledger and thereby the record of the transaction and the reference file included therein.

4. The apparatus of claim 1, wherein the processor is configured to execute the computer-readable program code to cause the apparatus to further generate the reference file in response to the request.

5. The apparatus of claim 1, wherein the processor is configured to execute the computer-readable program code to cause the apparatus to further generate the reference file before the request is received.

6. A method of content transaction consensus, the method comprising:

receiving a request to initiate a transaction for play of video or audio content, the request being received from a data network connected device having a native player;

validating the transaction by consensus in a peer-to-peer network that maintains a distributed ledger;

storing a record of the transaction in the distributed ledger only when the transaction is validated, the record including a reference file for the video or audio content with a plurality of player control parameter values and linking data for one or more designated content sources outside the peer-to-peer network; and providing access to the reference file by the data network connected device to enable the data network connected device to play the video or audio content, the data network connected device:

providing player control commands to the native player based on the player control parameter values, including player control commands directing the native player to acquire content data compatible with the native player from within a content data file of one or more of the designated content data sources via the data network using the linking data;

acquiring content data by the native player from the one or more content sources; and playing, by the native player, the content acquired from each content source in accordance with the player control commands.

7. The method of claim 6, wherein the distributed ledger is a blockchain, and storing the record of the transaction includes recording the transaction in a block of the blockchain.

8. The method of claim 6, wherein providing access to the reference file includes providing access to the distributed ledger and thereby the record of the transaction and the reference file included therein.

9. The method of claim 6 further comprising generating the reference file in response to the request.

10. The method of claim 6 further comprising generating the reference file before the request is received.

11. A computer-readable storage medium for content transaction consensus, the computer-readable storage medium being non-transitory and having computer-readable program code stored therein that in response to execution by a processor, causes an apparatus to at least:

receive a request to initiate a transaction for play of video or audio content, the request being received from a data network connected device having a native player;

validate the transaction by consensus in a peer-to-peer network that maintains a distributed ledger;

store a record of the transaction in the distributed ledger only when the transaction is validated, the record including a reference file for the video or audio content with a plurality of player control parameter values and linking data for one or more designated content sources outside the peer-to-peer network; and provide access to the reference file by the data network connected device to enable the data network connected device to play the video or audio content, the data network connected device being enabled to at least:

provide player control commands to the native player based on the player control parameter values, including player control commands directing the native player to acquire content data compatible with the native player from within a content data file of one or more of the designated content data sources via the data network using the linking data;

acquire content data by the native player from the one or more content sources; and play, by the native player, the content acquired from each content source in accordance with the player control commands.

12. The computer-readable storage medium of claim 11, wherein the distributed ledger is a blockchain, and the apparatus being caused to store the record of the transaction includes being caused to record the transaction in a block of the blockchain.

13. The computer-readable storage medium of claim 11, wherein the apparatus being caused to provide access to the reference file includes being caused to provide access to the distributed ledger and thereby the record of the transaction and the reference file included therein.

14. The computer-readable storage medium of claim 11 having computer-readable program code stored therein that in response to execution by the processor, causes the apparatus to further generate the reference file in response to the request.

15. The computer-readable storage medium of claim 11 having computer-readable program code stored therein that in response to execution by the processor, causes the apparatus to further generate the reference file before the request is received.

* * * * *